United States Patent
DeMesa et al.

(10) Patent No.: US 7,069,514 B2
(45) Date of Patent: *Jun. 27, 2006

(54) MODELING SYSTEM FOR RETRIEVING AND DISPLAYING DATA FROM MULTIPLE SOURCES

(75) Inventors: Jesse G. DeMesa, Lake Forest, CA (US); David C. Johnson, Aliso Viejo, CA (US)

(73) Assignee: IndX Software Corp., Aliso Viejo, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 10/726,430

(22) Filed: Dec. 3, 2003

(65) Prior Publication Data

US 2004/0117393 A1    Jun. 17, 2004

Related U.S. Application Data

(63) Continuation of application No. 09/704,471, filed on Nov. 1, 2000, now Pat. No. 6,700,590.

(60) Provisional application No. 60/162,975, filed on Nov. 1, 1999.

(51) Int. Cl.
G06F 17/00     (2006.01)
G06F 15/173    (2006.01)

(52) U.S. Cl. .................... 715/744; 709/224

(58) Field of Classification Search ............ 345/619, 345/440; 715/743, 744, 745; 709/224
See application file for complete search history.

(56) References Cited

U.S. PATENT DOCUMENTS

| 5,412,774 | A | 5/1995 | Agrawal et al. |
| 5,414,809 | A | 5/1995 | Hogan et al. |
| 5,760,770 | A | 6/1998 | Bliss et al. |
| 5,917,498 | A | 6/1999 | Korenshtein |
| 5,958,012 | A | 9/1999 | Battat et al. |
| 5,999,940 | A | 12/1999 | Ranger |
| 6,002,853 | A | 12/1999 | de Hond |

(Continued)

OTHER PUBLICATIONS

*Intellution Dynamics Package* by Intellution Inc., Foxborough, MA. Described in p. 2 of patent specification. Date Unknown.

(Continued)

*Primary Examiner*—Matthew Luu

(57) ABSTRACT

A model development system provides tools for developers to define reusable, object oriented components and views for collecting and displaying data from multiple sources, and for incorporating such reusable components and views into an informational model. Using the system, a developer can create a reusable component, create multiple instances of that component, and connect each such instance to one or more corresponding back-end data sources. The developer can also define one or more associated views that specify how data collected by the component from the back-end data sources is to be displayed. Many different components and views may be defined and deployed to build an informational model of a business entity, such as a business that operates processing or manufacturing plants in various locations.

37 Claims, 16 Drawing Sheets

U.S. PATENT DOCUMENTS

| | | | |
|---|---|---|---|
| 6,014,138 | A | 1/2000 | Cain et al. |
| 6,122,664 | A | 9/2000 | Boukobza et al. |
| 6,178,362 | B1 | 1/2001 | Woolard et al. |
| 6,246,410 | B1 | 6/2001 | Bergeron et al. |
| 6,247,020 | B1 | 6/2001 | Minard |
| 6,262,729 | B1 | 7/2001 | Marcos et al. |
| 6,263,339 | B1 | 7/2001 | Hirsch |
| 6,301,584 | B1 | 10/2001 | Ranger |
| 6,307,546 | B1 | 10/2001 | Wickham et al. |
| 6,336,138 | B1 | 1/2002 | Caswell et al. |
| 6,407,761 | B1 | 6/2002 | Ching et al. |
| 6,505,246 | B1 | 1/2003 | Land et al. |

OTHER PUBLICATIONS

*In Touch* by Wonderware Corp., Irvine, CA. Described in p. 2 of patent specification. Date unknown.

User's Guide for version 1.1 of XHQ from Indx Software Corporation, 75 pages (see associated description in Information Disclosure Statement filed Jun. 5, 2003 in parent application).

Press release titled "Indx Releases Version 1.1 of Indx HQ," dated Dec. 31, 1998, 2 pages (see associated description in Information Disclosure Statement filed Jun. 5, 2003 in parent application).

FIG. 13

MODELING SYSTEM FOR RETRIEVING AND DISPLAYING DATA FROM MULTIPLE SOURCES

RELATED APPLICATIONS

This application is a continuation of U.S. patent application Ser. No. 09/704,471, filed Nov. 1, 2000, now U.S. Pat. No. 6,700,590, which claims the priority date of U.S. provisional patent application No. 60/162,975, filed Nov. 1, 1999, which is hereby incorporated by reference.

BACKGROUND OF THE INVENTION

1. Field of the Invention

The present invention relates to collecting, modeling, and providing access to information.

2. Description of the Related Art

A number of attempts have been made to retrieve data from a business organization's various data sources (called back-end data sources) and to present that data to users. An organization's various back-end data sources may contain different types and formats of data, including relational data, point data, time-series data, and object data. Relational data comprise data from multiple tables of multiple fields. The tables may be related to each other through indexes. Point data is single-type data typically associated with manufacturing systems. For example, a data system may continuously collect a motor's operating speed and operating temperature as point data. Unlike relational data, point data typically are not comprised of multiple tables. Time-series data are data that store the change in data value over time. Object data are data represented by objects. The concepts of object, object-oriented design, object-oriented programming and object-oriented databases are known to those skilled in the art.

Data warehouse products and more custom database approaches typically collect data from back-end data sources and deposit the data into a new data warehouse (or data mart) for data analysis and presentation. Some data mining processes operate on data warehouses to provide detailed analysis such as marketing and sales trends, and to test hypotheses such as customer buying patterns. However, those analyses are usually only available to a few analysts and executives in an organization. In addition, a data warehouse usually stores historical data for long term analysis, but is not suitable for real time or near real time applications.

Application packages such as Intellution Dynamics Package by Intellution, Inc. of Foxborough, Mass. and In Touch by Wonderware Corporation of Irvine, Calif. provide for visualization of plant operational data in some manufacturing systems. These packages have very limited abilities to retrieve and present relational data typically associated with other manufacturing systems and non-manufacturing systems such as enterprise resource planning (ERP) systems. Typically, the major limitations include an inability to monitor relational data as it changes over time, navigate the relational data for more detailed monitoring or status, and to find supporting details. Because they do not provide access to both point data and relational data, enterprises often have to use multiple systems to provide data visualization, navigation and analysis of various types and formats of data. Using multiple systems often results in high financial and computing expenses and programming and administrative complexity.

Some systems convert back-end data into relational data stored in a relational database for selection, analysis and visual presentation. Such a relational database typically needs to be managed by a database administrator in order to handle the complexity of a relational database comprising multiple tables and indexes. This is especially true when data has to be converted and acquired from different back-end systems. In addition, those systems cannot utilize the advantages of object data.

Some systems convert point data and relational data from back-end data sources into point data to present to users. Since the back-end data are converted into point data, those systems cannot utilize the advantages of object data and also lose any benefits associated with relational data.

Other systems convert back-end data into object data, but fail to provide access to the object data using a class-based representation model. What is needed is a system and method providing access to back-end data in object form, in real time, and using a class-based component and view model.

SUMMARY

One aspect of the invention involves the use of a class-based component and view model to collect and display data from multiple sources. The class-based component and view model is preferably embodied within a system that uses reusable components and views to monitor the operation of a business entity, such as but not limited to a business entity that has manufacturing facilities or plants in various locations. The data that is collected and displayed by the system may, for example, include relational data, point data and/or time-series data. The system also preferably includes development tools for creating and deploying the reusable components and views to generate an information model for monitoring the business entity.

To generate a model in a preferred embodiment, reusable components are initially defined for each type of business element or data source to be monitored. For example, a "plant" component may be generated that represents the general structure of a manufacturing or processing plant, and a "pump" component may be generated to represent a type of pump. A given component may include one or more other components as members. For example, if each plant within the business entity includes multiple pumps, the associated plant component may include multiple pump components. The task of generating the reusable components is performed in the preferred embodiment using a component builder tool.

In addition to defining reusable components, one or more reusable views may be defined for a given component to specify how data collected by that component is to be displayed. Each such view is generally a graphical representation of a corresponding component, and may include graphs, charts, animations, and/or other types of graphical elements to represent the associated data collected by that component. If a first component is a member of a second component, a first view associated with the first component may optionally be inserted into a second view associated with the second component, such that the first view is automatically displayed as a subset of the second view. The task of generating the reusable views is performed in the preferred embodiment using a view builder tool.

The system preferably allows multiple views to be defined for the same component, and thus allows users or developers to build different views of varying levels of detail corresponding to the same component. This is advantageous because different people within a business organization may demand different views that connect to the same data. For example, a plant foreman may want views that show the operating temperature, speed and production numbers of machines. The plant supervisor may want views that show the production numbers of machines. The company executive may want views that show the production totals of each plant. Some prefer to have data displayed in tables while others prefer charts.

Once one or more reusable components and associated views have been generated, a solution builder tool may be used to generate an informational model or "solution" for a business entity. This task involves creating instances of specific components, and connecting these instances to respective back end data sources. For example, if a given business entity has physical plants in Chicago, Milwaukee and Cleveland, three separate instances of the "plant" component may be created, one for each physical plant. Each such component instance would also be connected to the corresponding back end data source or sources (point data sources, databases, etc.) associated with its respective physical plant. As part of this process, different data collection frequencies and other data connection parameters may be specified for different instances of the same component. The task of creating a solution from a set of preexisting components can advantageously be performed by a person having little or no knowledge of the structure of the associated components. If changes are made to a particular component or its view(s) over time, the changes may be propagated automatically to all instances of the associated component.

The solution or model may be navigated in the preferred embodiment using a navigation tree in which each instance of each component is represented by a respective node or icon within an expandable tree. Using the navigation tree, a user can select a node (component instance) and view the associated data collected by that instance. If multiple views have been defined for an associated component (e.g., basic view, detailed view, etc.), the user can also select between these alternative views. In one embodiment, users can access the navigation tree using an ordinary web browser.

Neither this summary nor the following detailed description purports to define the invention. The invention is defined by the claims.

BRIEF DESCRIPTION OF THE DRAWINGS

FIG. 13 illustrates a connection tab screen of the solution builder.

DETAILED DESCRIPTION OF THE PREFERRED EMBODIMENT

Figure 1:
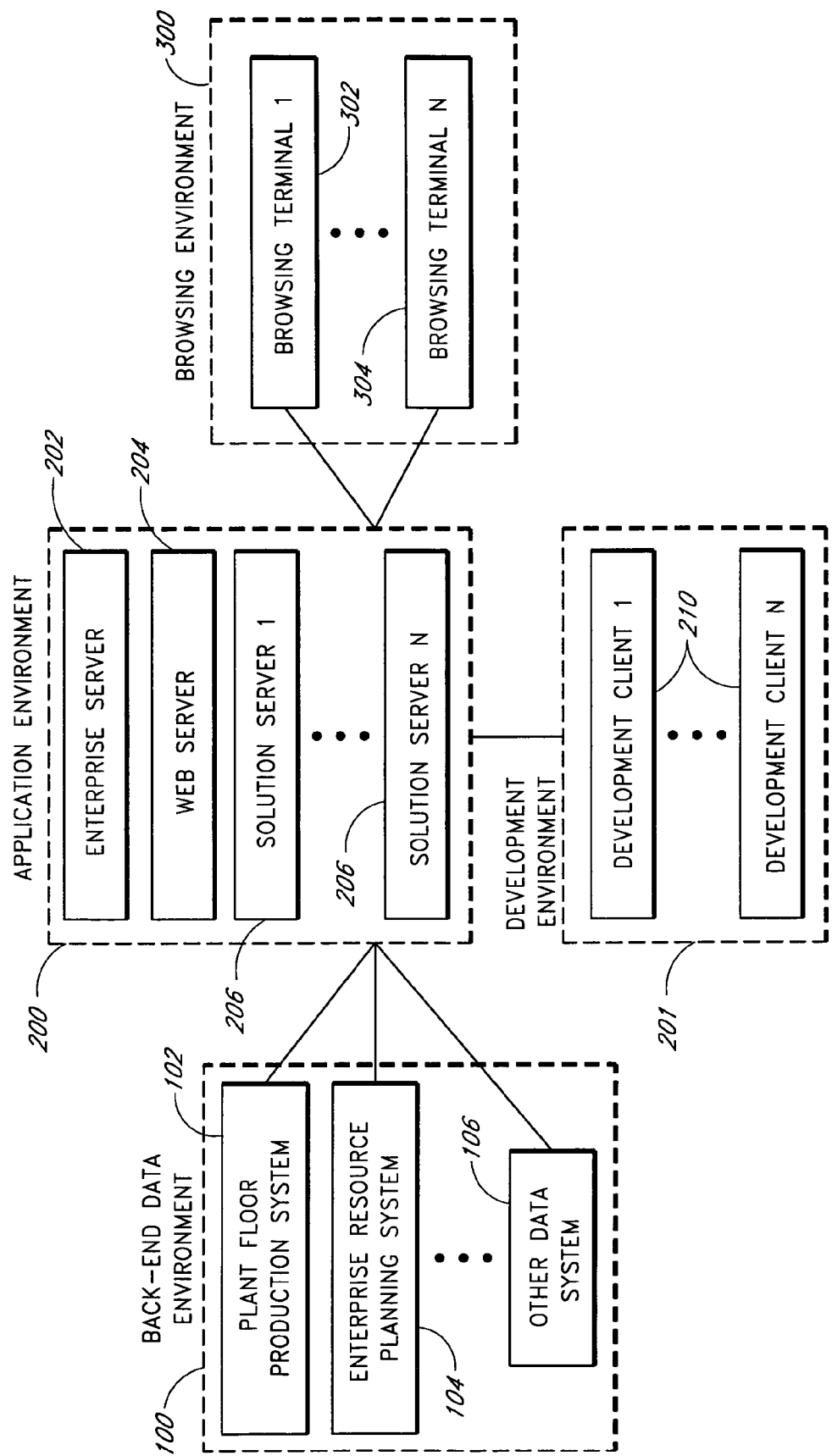
FIG. 1 illustrates components and environments that use one embodiment of the present invention.

FIG. 1 illustrates components and environments according to one embodiment of the present invention. A back-end data environment 100 comprises various data sources, such as plant floor production systems 102, enterprise resource planning data systems 104, and other data systems 106. Such data sources contain data of various formats, such as relational data, point data, time-series data, object data, or a combination thereof. The various data sources from the back-end data environment 100 are connected to an application environment 200. As used herein, the term connected means directly or indirectly capable of communicating over a direct wired, network or wireless connection.

The application environment 200 comprises an enterprise server 202, a web server 204, and one or more solution servers 206. The application environment 200 is connected to a development environment 201. The development environment 201 comprises one or more development clients 210. In the preferred embodiment, the enterprise server, solution servers and development clients comprise application programs in Java and/or C++ and running under Windows NT.

The application environment 200 is connected to a browsing environment 300. The browsing environment 300 comprises one or more browsing terminals 302. Each browsing terminal 302 comprises a communication program such as a web browser. In the preferred embodiment the browsing terminals 302 are connected to the application environment 200 through the Internet using web browsers such as Netscape Communicator or Internet Explorer launched from the browsing terminals 302. In another embodiment, the browsing terminals 302 are connected to the application environment 200 through an Intranet.

The system provides options for a developer or user to specify the frequency at which data is to be fetched from the back-end environment 100 into the application environment 200. If data were fetched too frequently, it would be a waste on system resources and may adversely affect system performance. On the other hand, if the data were not fetched frequently enough, a user could end up viewing data that is unacceptably out-dated. By fine-tuning the fetching frequency, a developer or user can ensure that users view data that is sufficiently timely. The system and method for specifying the data fetch frequencies are known to those skilled in the art.

Figure 2:
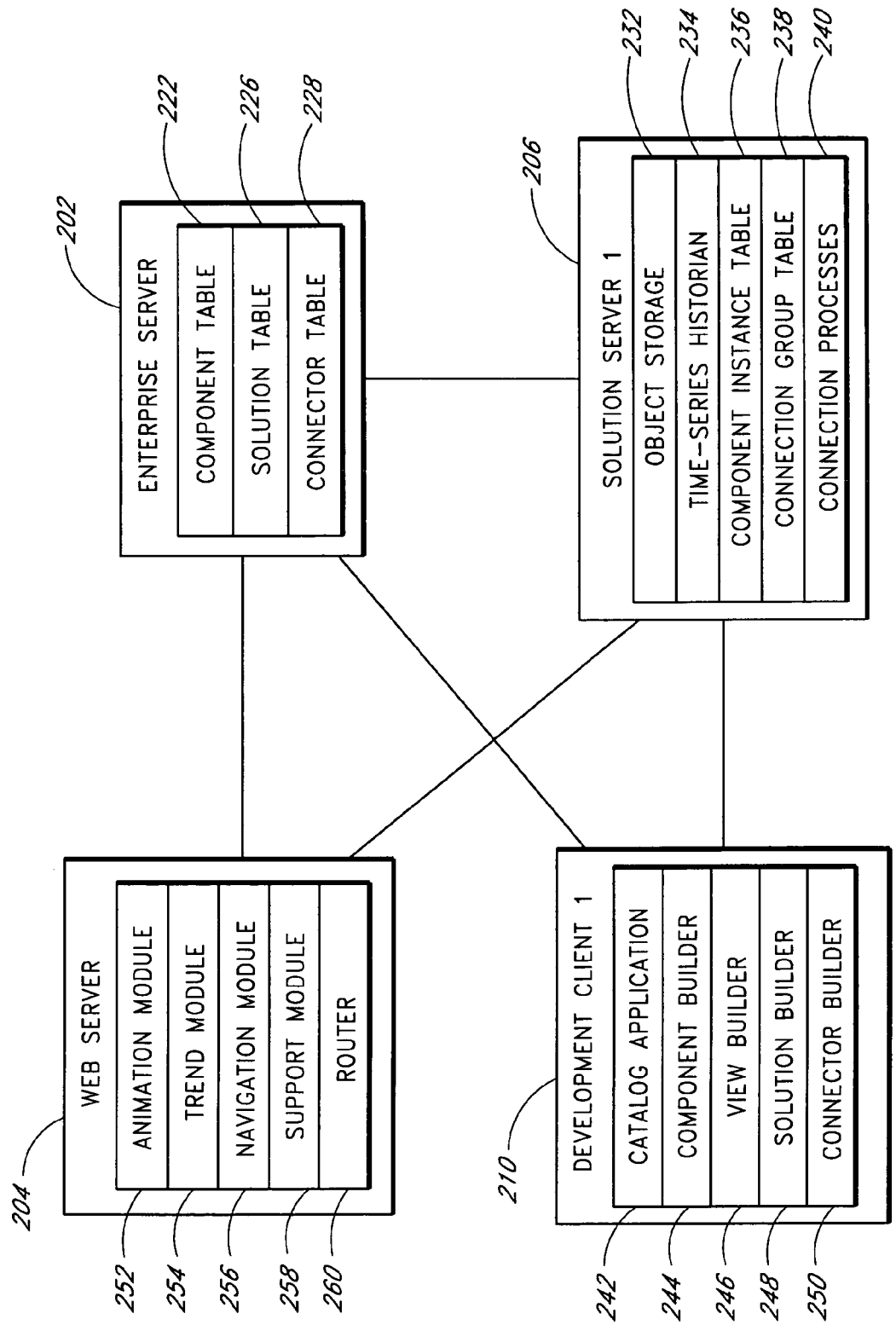
FIG. 2 illustrates a representation of modules of an application environment and a development environment in accordance with one embodiment of the present invention.

FIG. 2 illustrates a representation of modules of the application environment 200, and the development environment 201. While the preferred embodiment may comprise multiple solution servers and multiple development clients, only one solution server 206 and only one development client 210 are shown on FIG. 2 for ease of illustration.

The enterprise server 202 comprises a component table 222 that stores component definitions. A component is a reusable software resource that contains and represents the information associated with a data source, such as a business entity. Thus, for example, a component may represent a customer, a shipping route, or a credit check process. A component can represent a collection, for example, yesterday's customer orders from a back-end relational database. By using components to represent business elements, the system facilitates user understanding in terms of the business process. A component is made up of one or more members. Each member can be a number, a date, a text string, a Boolean logical value, or another component. For example, a "customer" component may be comprised of members such as name, identification number and address. A run-time usage of a component is called a component instance. When a component is reused, a unique instance of that component is created, with a unique name. Different instances of the same component can follow different instructions on where, when, how and how often to retrieve back-end data.

For each component represented in the component table 222, the component table 222 also stores definitions of views associated with that component. By storing all component and view definitions on the enterprise server 202, the system ensures that all developers and users across the enterprise can utilize and inherit the same component and view definitions. The enterprise server 202 also comprises a solution table 226 that stores the names, descriptions and locations of solutions, and a connector table 228 that stores the name, description and configuration code of all connectors. The connection process configurations are stored in the solution servers 206 in the connection processes module. The connection processes that execute commands to acquire component instance data and global collection data from back-end data sources are located on the solution servers 206. A solution is a component instance with a defined connection to a back-end data. A connector comprises program code for connecting a component instance or a global collection to a back-end data source. A global collection represents multiple instances of the same class of data, such as "all orders," "all customers," or "all customers from the East Region."

The web server 204 comprises an animation module 252 which displays views with animation effects and manages user interaction with the views, a trend module 254 which displays trends of component instance data change as data change over time, a navigation module 256 which manages the tree-structure navigation of views, and a support module 258 which supports data communication between the application environment 200 and the browsing environment 300. In one embodiment, the animation module 252, the trend module 254, the navigation module 256 and the support module 258 comprise one or more Java applets. The web server 204 also comprises a router 260 as the data communication gateway between the browsing terminals 302 and the application environment 200.

The solution server 206 comprises an object storage 232, a time-series historian 234, a component instance table 236, a connection group table 238 and a connection processes module 240. The object storage 232 receives data from the back-end data environment 100 and stores such data. The object storage 232 stores some objects in memory and commits other objects to disk to allow for storing large quantities of data. Those of ordinary skill will appreciate that objects may be stored entirely in memory or on disk or on other media, and the present invention is not limited by the type of media used to store objects.

Even if users want the same data, the data only needs to be retrieved from the back-end environment 100 once, and can then be transmitted from the object storage 232 to one or many users who request it. Since the data are stored directly in memory or disk, and not in a relational database, the data administration task is typically simpler than a relational database.

The time-series historian 234 is a database preferably optimized for storing time-centric data. The time series historian 234 stores time-stamped data values received from the back-end data environment 100. The time-series historian 234 can be an independent third-party product or can be custom-designed. It will be appreciated by those of ordinary skill that a flat file system or database may be used to implement the time-series historian 234.

The component instance table 236 stores the connection configurations for each component instance within the solution held by that solution server 206. The connection configurations comprise a connection group to connect to the back-end data, or a program command to select a subset of a global collection, as described in connection with FIG. 7.

A connection group comprises a connection process and a connector. A connection process is the program command that starts the execution of the connector. The connection group table 238 stores connection groups.

The connection processes module 240 comprises a table storing connection processes and their respective locations. The connection processes module 240 uses connection processes to retrieve data from the back-end data environment 100, and sends the retrieved data to the object storage 232. If a user or developer selects, for example, in the solution builder 248, an option to store data in time-series historian, the connection processes module 240 sends the retrieved data to the time-series historian 234 for storing.

The development client 210 comprises a catalog application 242, a component builder 244, a view builder 246, a solution builder 248, and a connector builder 250. Components and views are created or modified within the development client 210 and sent to the enterprise server 202 to be stored in the component table 222. The catalog application 242 is an interface that includes and provides access to a list of components. Each component is represented by a component name and an icon. When a developer or user selects a component from the list for modification or starts to create a new component, the developer/user is directed from the catalog application 242 to the component builder 244. The component builder 244 allows a developer or user to create and edit components.

When a developer/user selects a component from the catalog application 242, the developer/user may select the menu option "create new view" to create a new view for that component, or may select the menu option "edit view" to edit a view for that component. The developer/user will then be directed from the catalog application 242 to the view builder 246. The view builder 246 allows a developer or user to create and edit views to attach to existing components.

Figure 11:
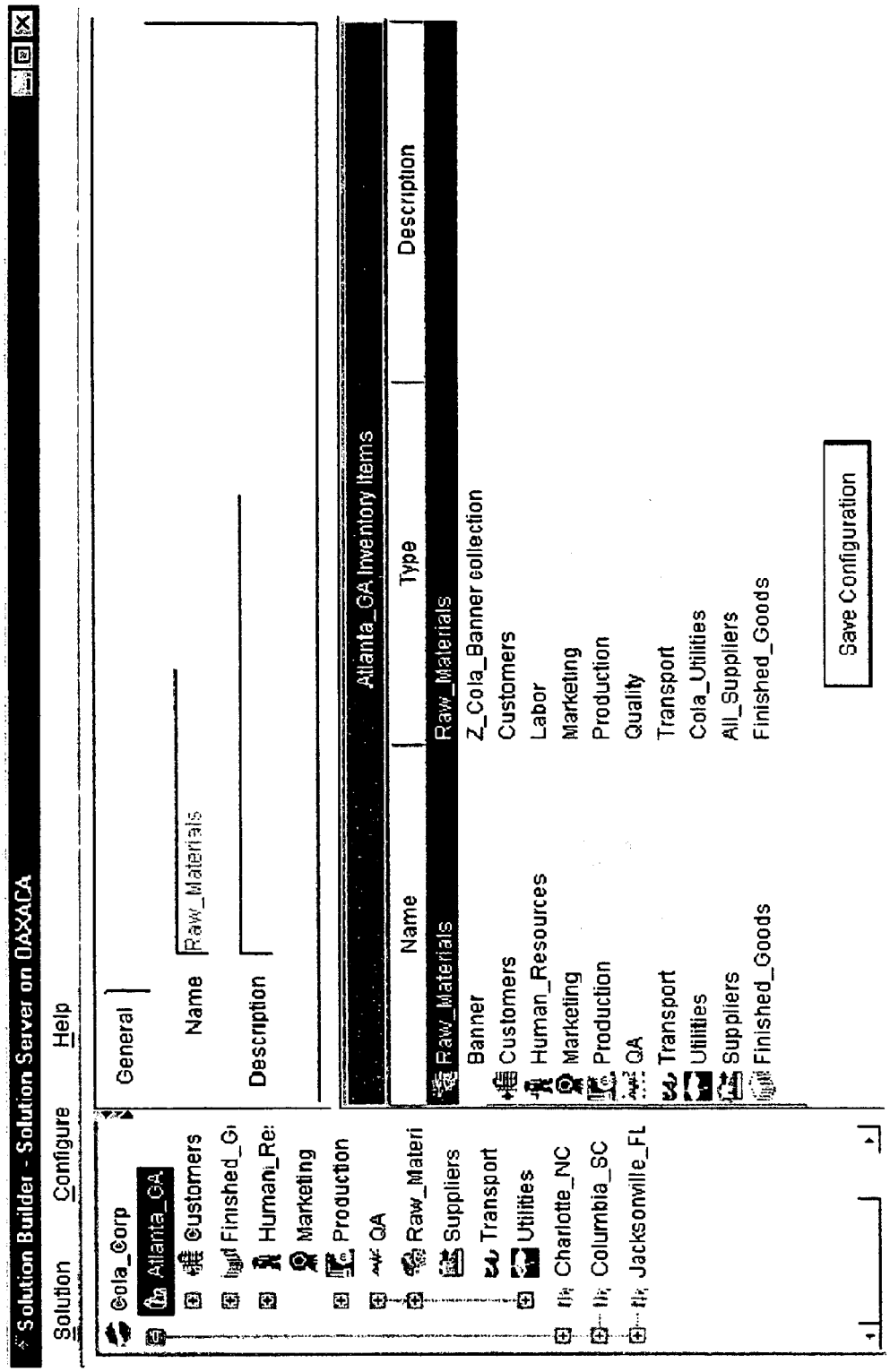
FIG. 11 illustrates a screen display of the solution builder of FIG. 2, showing an example solution tree on the left hand side.
Figure 12:
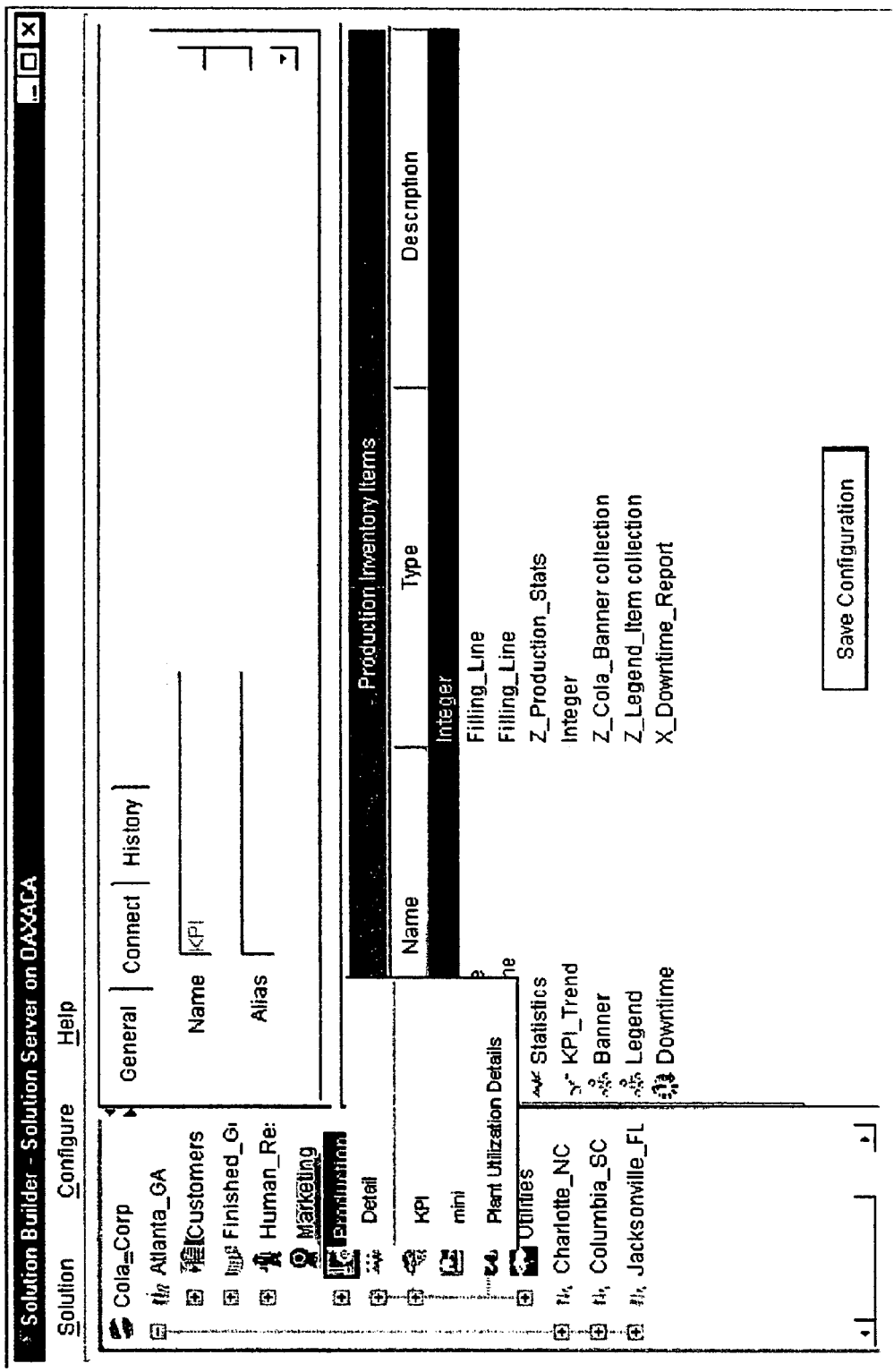
FIG. 12 illustrates a user interface through which a user of the solution builder can select from a list of views that are available for a selected component/component instance in the solution tree.

The solution builder 248 allows a developer or user to create or modify a solution, and to specify how to connect the solution to back-end data sources. In one embodiment, the present invention supports Microsoft's Dynamic Data Exchange (DDE) protocol and Microsoft's Open Database Connectivity (ODBC) application programming interface for connecting to back-end data sources. An example screen display of one embodiment of the solution builder 248 is shown in FIG. 11, with a solution tree shown on the left hand side. Another example screen display is shown in FIG. 12, which shows how a user of the solution builder 248 can select from a list of views that are available for a selected component instance to view data collected by that instance.

The connector builder 250 allows a developer or user to add, modify or delete a connector. A connector is the program code that connects to back-end data. The created or modified connector definitions are transmitted from the connector builder 250 to the enterprise server 202 and stored in the connector table 228. Each connector has an associated connector type such as ODBC, DDE, Oracle or MS-SQL.

Figure 3:
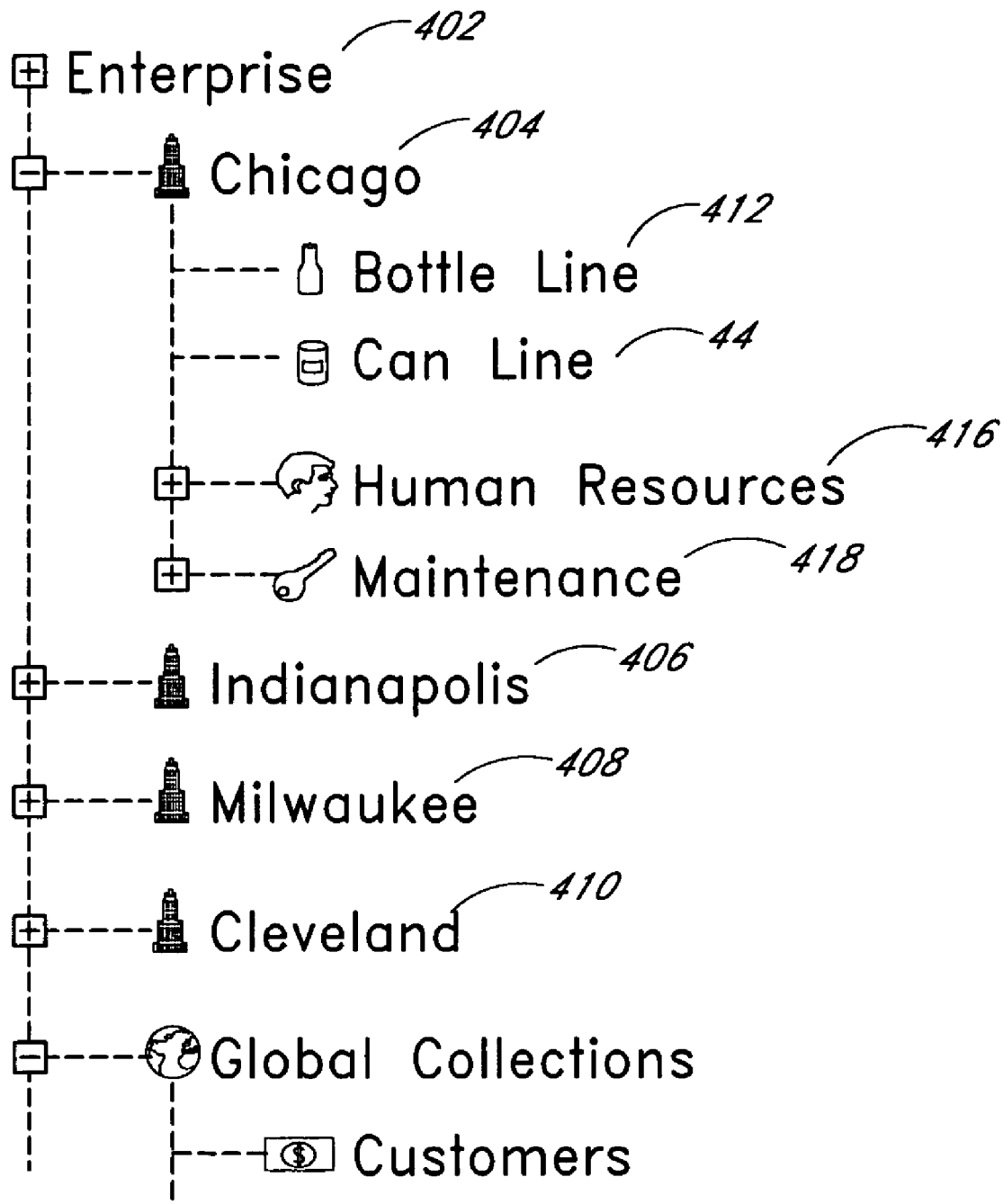
FIG. 3 illustrates the tree-style solution display and navigation structure of the preferred embodiment.

FIG. 3 illustrates a tree style navigation and display structure representing solutions. As FIG. 3 illustrates, the top node solution "enterprise" 402 comprises several member solutions representing plants in Chicago, Indianapolis, and Milwaukee. The Chicago plant 404, the Indianapolis plant 406, the Milwaukee plant 408 and the Cleveland plant 410 are solutions each corresponding to a "plant" component, but with different connections to back-end data. In one embodiment of the present invention, the component "plant" comprises the members "bottling line," "can line," "human resource," and "maintenance," each such member being a component. Therefore, the Chicago plant 404 has a bottling line 412, a can line 414, a human resource department 416 and a maintenance department 418. The other plants have the same members but may connect to different back-end data.

The tree style display and navigation structure is preferred because it is visually intuitive. A tree branch may comprise sub-branches, as a component may comprise member components. However, solutions may also be displayed using other presentation and navigation structures. Programming controls, such as the Visual Basic Tree View control, are known to those of ordinary skill, and can be used to generate navigable displays representing hierarchical relationships between objects by a visual arrangement of labels and/or icons associated with represented objects. See, for example, Microsoft Visual Basic—Professional Features, Microsoft Corp., 1995.

At run time, a solution represents an instance of a corresponding component. A developer or user can define and modify the run-time attributes of a solution component instance, such as name, description, and connection characteristics. Such connection characteristics may include what data sources to connect to, when to connect, the program code or system command to connect to a data source and retrieve data, and how frequently to retrieve data. When one or more components that make up a solution have been changed, i.e., when members are added to, modified, or deleted from a component, or the name or icon of the component has been changed, a developer or user may update the solution through a menu option. This action updates the solution to include the latest changes to the components.

A node "global collections" and a sub-node "customers" are displayed at the bottom of the solution tree in FIG. 3. The global collection section will be described in connection with FIG. 7.

Figure 4:
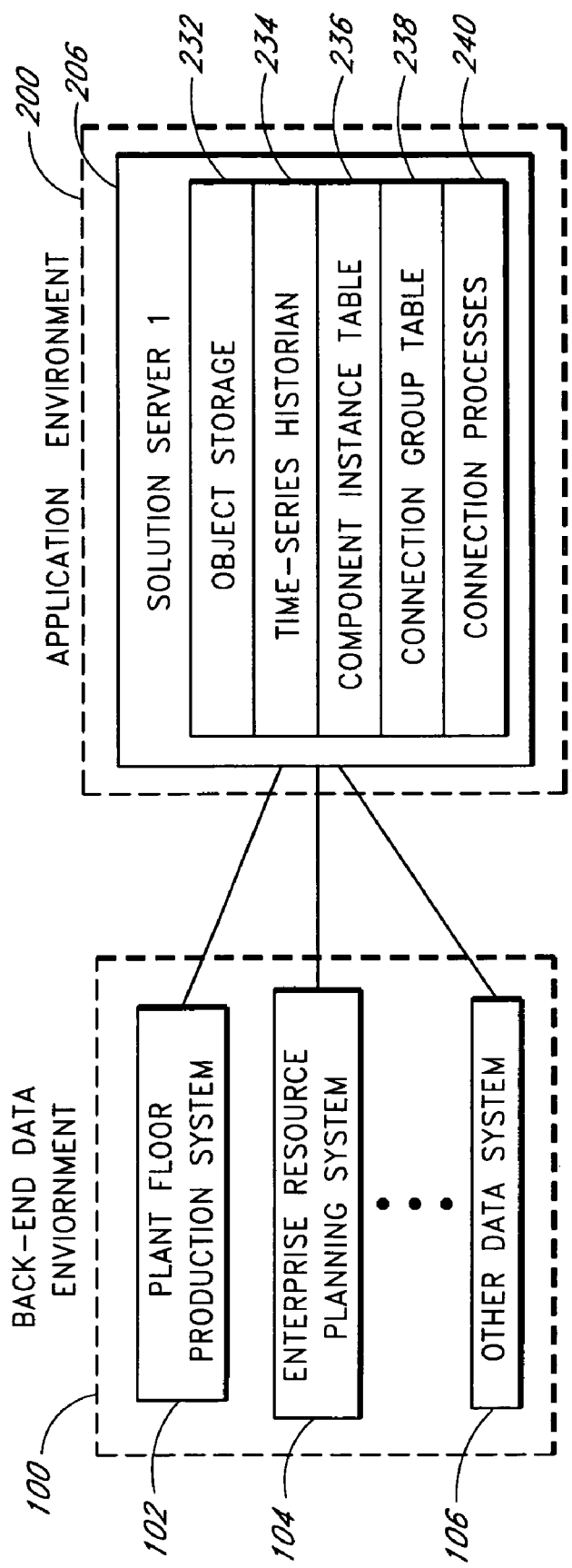
FIG. 4 illustrates an embodiment of the data communication between the application environment and the back-end data environment.

FIG. 4 illustrates the back-end data environment 100 connected to the application environment 200, through solution server 206. While multiple solution servers may be connected to the back-end data environment 100, only one solution server 206 is shown for ease of illustration. The connection processes module 240 retrieves data from the back-end data environment 100 and sends the retrieved data to the object storage 232. If specified in the solution builder 248 to be stored in the time-series historian 234, then the retrieved data is also stored in the time-series historian 234.

The object storage 232 receives and stores relational data and point data. Point data is retrieved by the connection processes module 240 from the back-end data environment 100 to the object storage 232, when a view corresponding to such point data is displayed on a browsing terminal 302. This run-time retrieval of point data retrieves only the set or subset of point data that is requested by the displaying view, and only when requested.

Relational data and other collection data are retrieved by the connection processes module 240 from the back-end data environment 100, to the object storage 232, when a solution connects such relational data to the solution using a connection group. A solution can also connect to back-end data by selecting a subset of a global collection that connects to back-end data. In one embodiment, a process connected to the relational data source in the back-end data environment 100 automatically detects changes and sends changes to the back-end data as change records to the object storage 232 and the recorded changes are applied to the data in the object storage 232. This method of applying changes reduces the quantity of data needed to be retrieved from the back-end data environment 100. In another embodiment, the back-end data environment 100 does not create change records, and data from the back-end data environment are transmitted to the object storage 232 according to the data retrieval frequency specified in the connection group.

Figure 5:
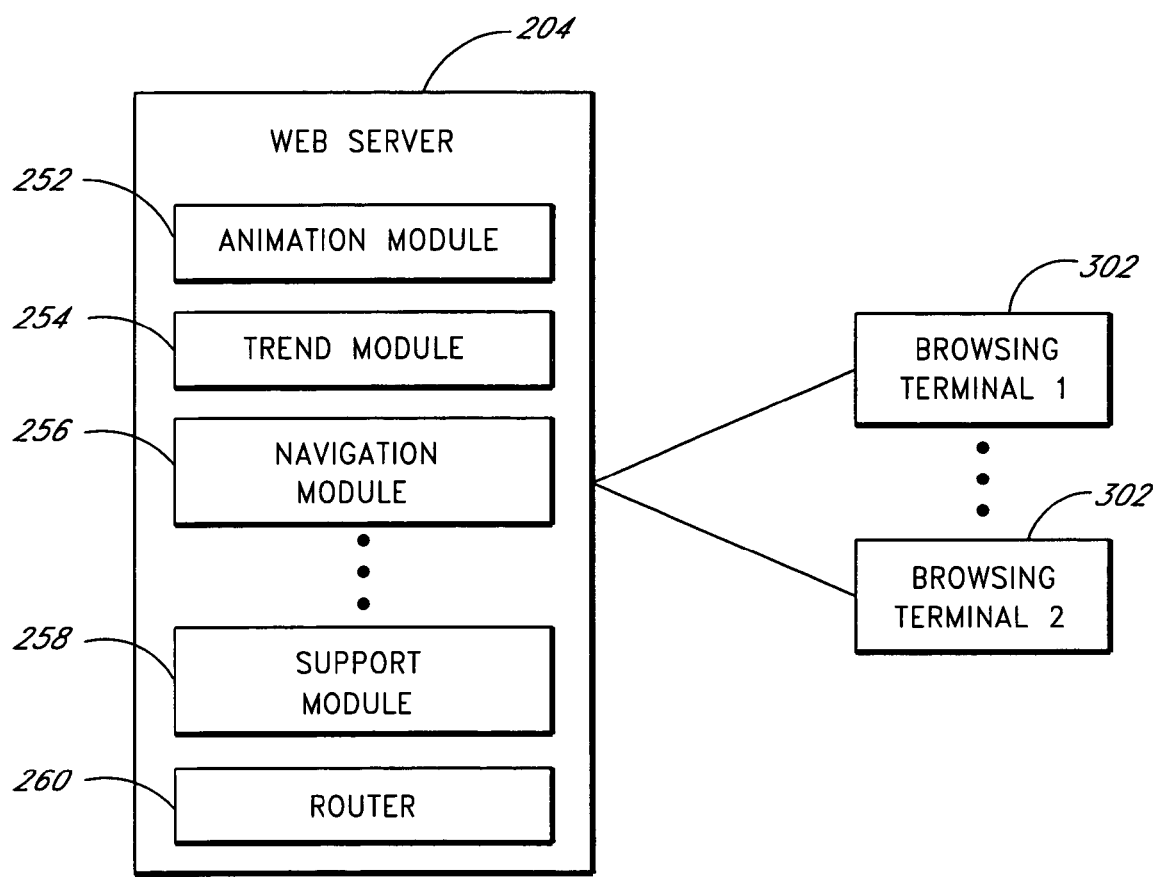
FIG. 5 illustrates an embodiment of the data communication between the application environment and the browsing environment.
Figure 16:
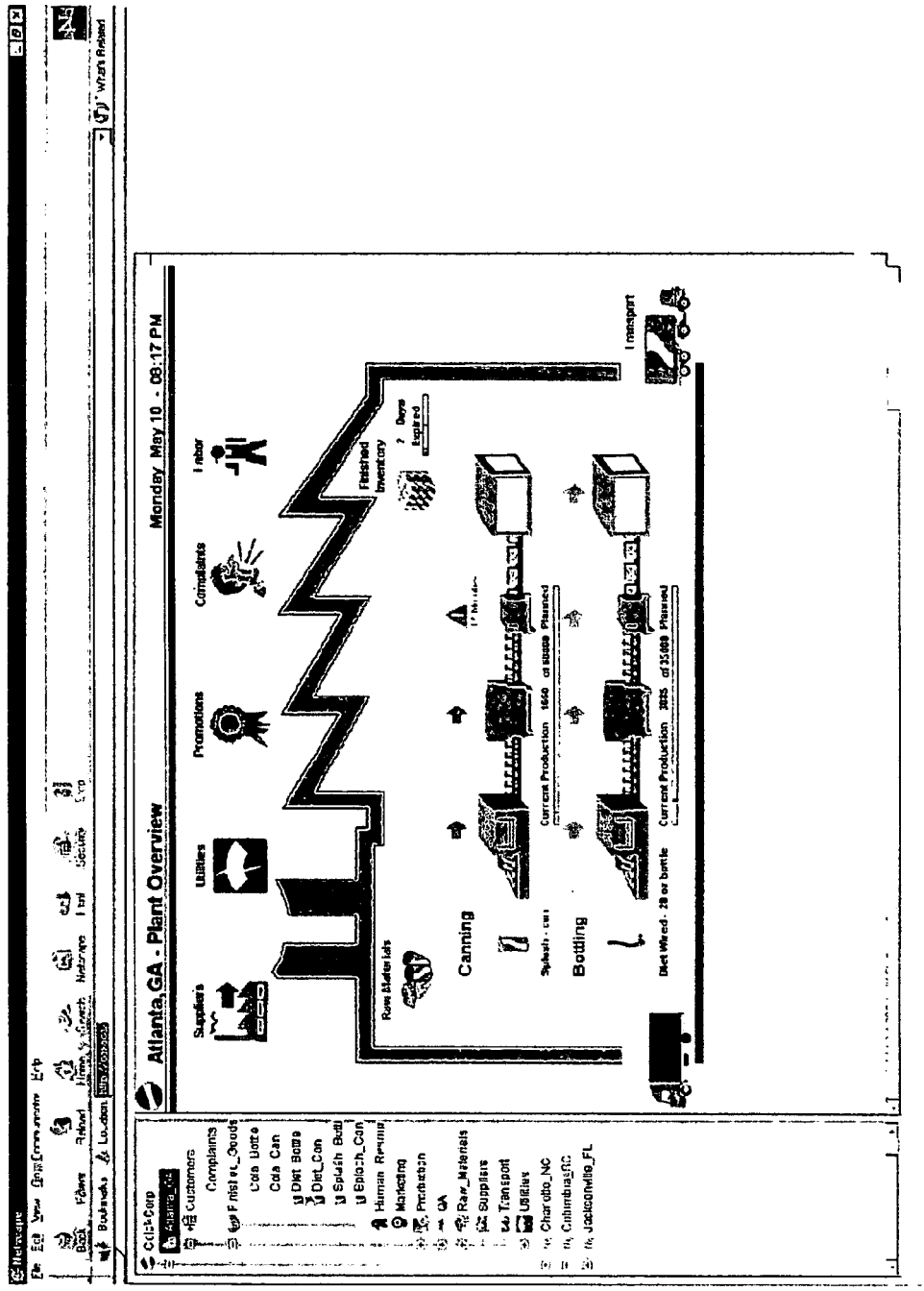
FIG. 16 illustrates a browser-based view of a solution, with the solution tree shown in the left panel and a populated view of the selected component instance in the right panel.

FIG. 5 illustrates the browsing terminals 302 and the web server 204. The browsing terminals 302 connect to the web server 204 through a computer network by launching a web browser such as Microsoft Internet Explorer or Netscape Communicator. The applet or applets comprising the modules 252, 254, 256 & 258 are downloaded from the web server 204 to the browsing terminals 302. Using the downloaded applet(s), the browsing terminals 302 display the views defined in the enterprise server 202 representing component instances in solution servers 206. From the browsing terminals 302, users can select one or more existing views for display, but cannot update components, views or solutions. If users are given access, they can create and edit components, views and solutions from the development clients 210. An example screen display showing how solutions may be viewed within a web browser is shown in FIG. 16, with the solution tree shown in the left panel and a populated view of the selected component instance in the right panel.

The router 260 is the data communication gateway between the browsing terminals 302 and the application environment 200. The router 260 retrieves view definitions and component definitions from the component table 222 in the enterprise server 202. Data and component instances requested by the browsing terminals 302 are transmitted from the solution servers 206 through the router 260 to the browsing terminals 302.

A user/developer can use the animation module 252 to pick a data display field within a view, and select a "show trend" option to display the change of data over time for the component member represented by that data display field. The trend module 254 then provides a graphic representation of data change over time for the component member. Historical data is retrieved from the time-series historian 234 or the back-end time-series historian.

Figure 6:
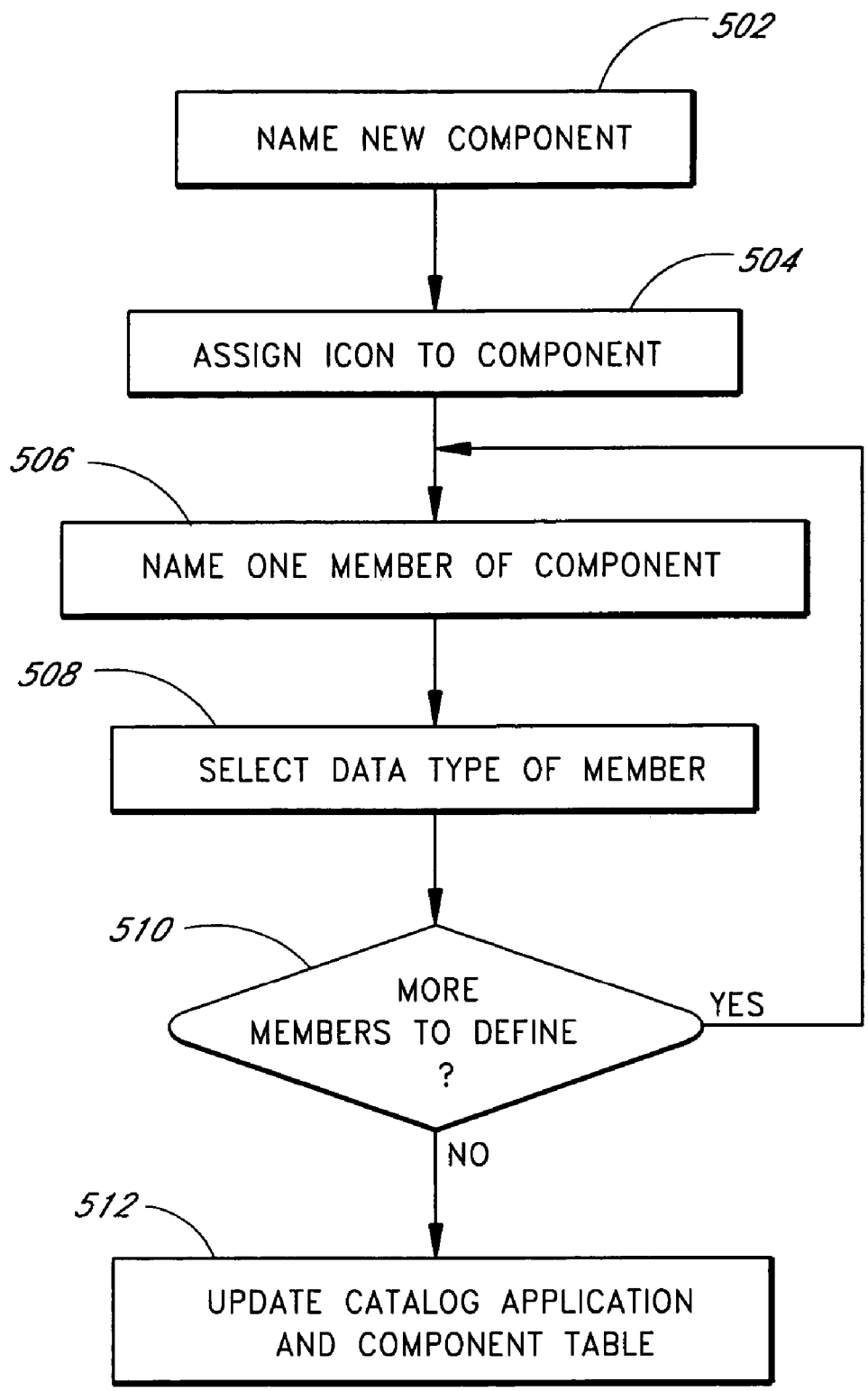
FIG. 6 is a flowchart illustrating a process of creating a component.

FIG. 6 is a flowchart illustrating a process of creating a component. When a user or developer selects the menu option "create new component" in the catalog application 242, he/she is then directed to the component builder 244 and prompted to enter a name for the new component in step 502. The new component name must be different from existing component names. In one embodiment the user/developer is also prompted to enter a text description for the new component. The user/developer is then prompted to assign a graphic icon to the new component in step 504. The user/developer is presented a list of icons or allowed to search for icon files. In the preferred embodiment the user/developer is prompted to assign two icons to a new component, including one small icon and one large icon for various display of the component.

Figure 10:
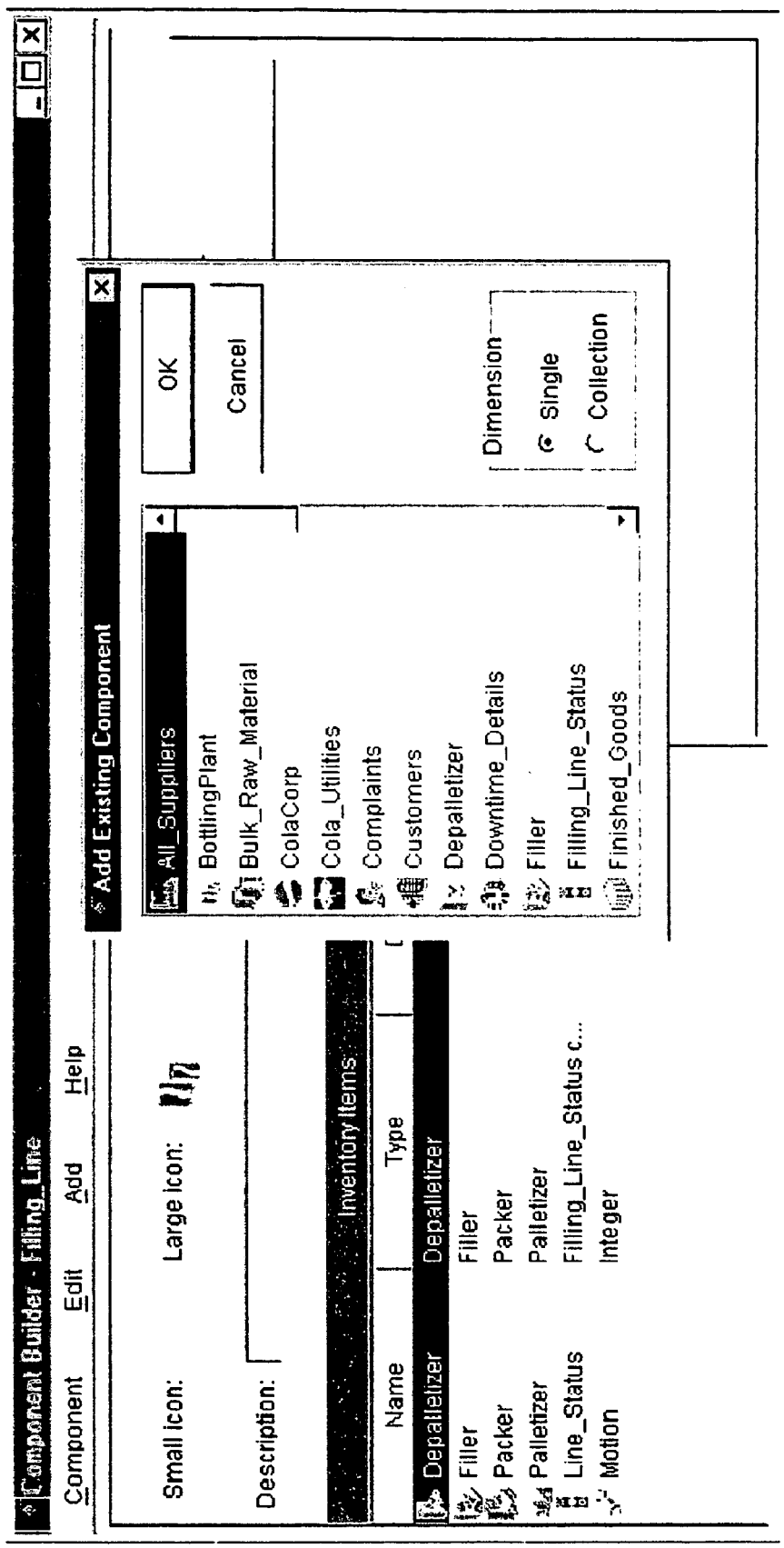
FIG. 10 is an example screen display of the component builder of FIG. 2 illustrating a user interface for adding an existing component member to a component.

The user/developer is then prompted to define members of the component. The user/developer is prompted to define the name of the member in step 506, and to select the data type of the member in step 508. The data type can be a primitive type such as integer, decimal number, Boolean logical value, text string or date, or an existing component. An example screen display illustrating the process of adding an existing component as a member is shown in FIG. 10. The user/developer continues adding members to the component, until he/she indicates at step 510 that all members have been added. In the preferred embodiment the user/developer makes this indication by selecting a "save component definition" menu option. In step 512 the client development client 210 updates the catalog application 242 to include the name and icon of the new component. In step 512 the development client 210 also sends the new component definition to the component table 222 in the enterprise server 202. In another embodiment, the user or developer starts the process of creating a component in the component builder 244.

Figure 7:
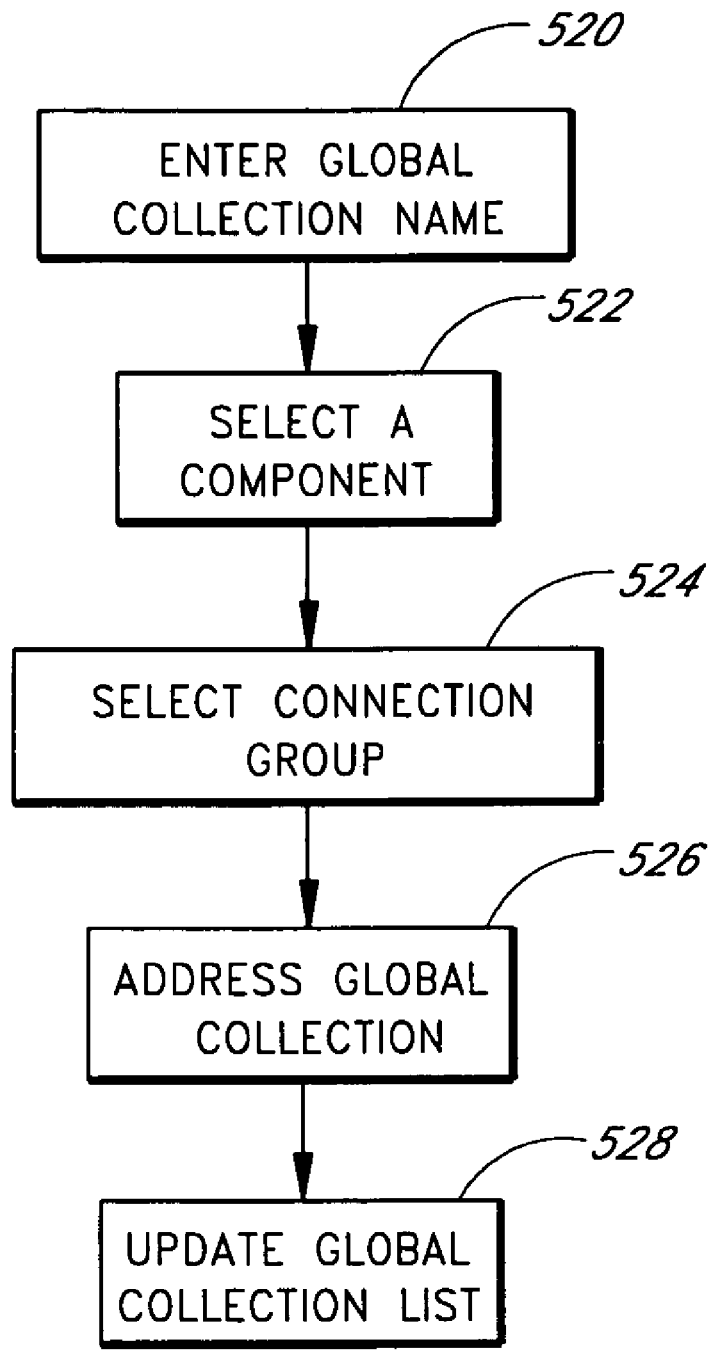
FIG. 7 is a flowchart illustrating a process of creating a global collection.

FIG. 7 is a flowchart illustrating the process of creating a global collection. A global collection represents multiple instances of the same class of data, such as "all orders," "all customers," or "all customers from the East Regional Database." A component member designated a collection member is connected to back-end data through "filtering" a global collection, i.e., selecting a subset of a global collection. A component member representing multiple instances of the same type is preferably designated a collection member. A member not designated a collection member connects to back-end data through a connection group, as described above. For example, a component member "customers" of a "sales organization" component may contain a collection of more than one customer.

Figure 14:
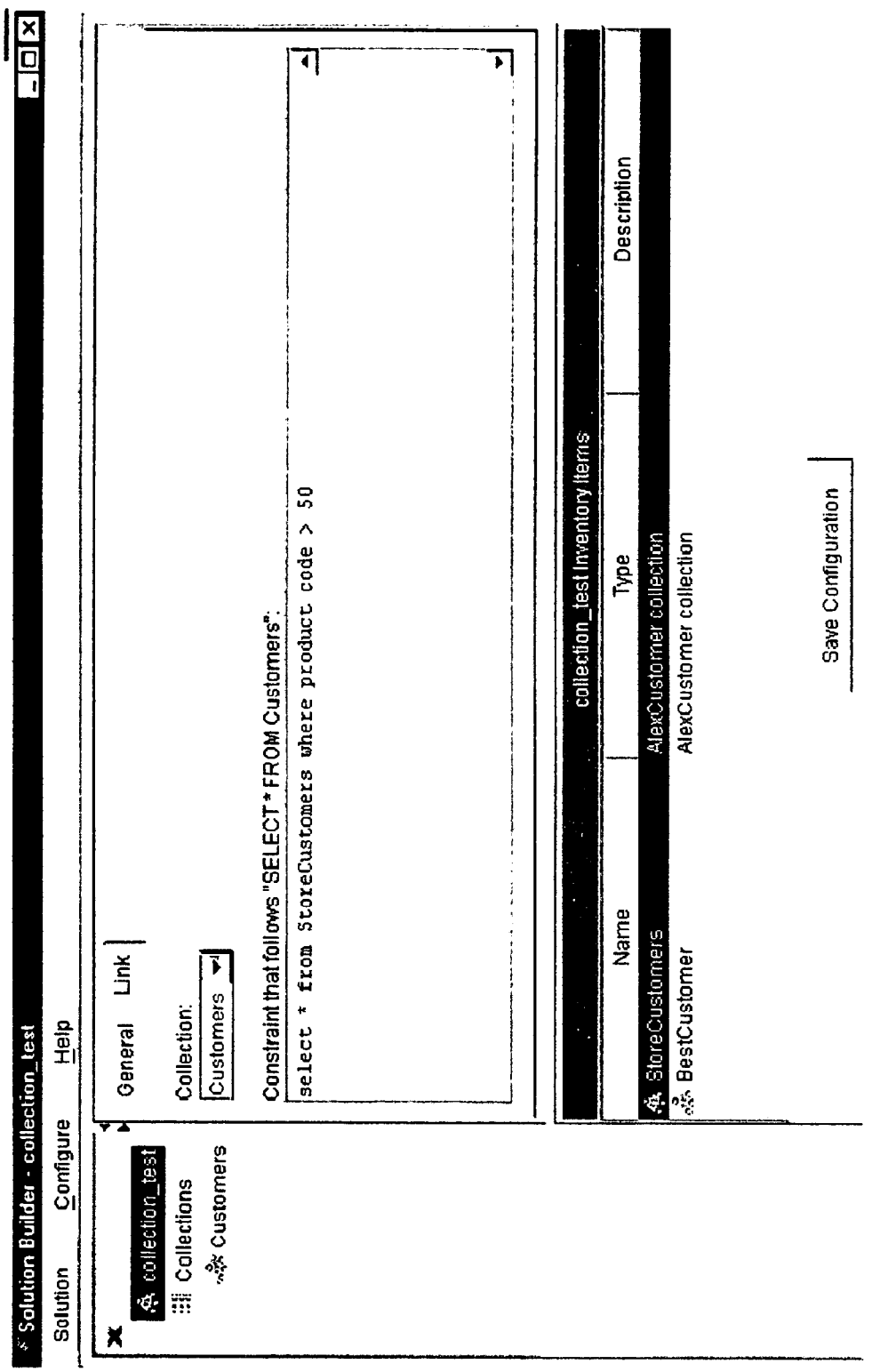
FIG. 14 is an example screen display of the solution builder illustrating the process of connecting a collection component to a global collection called "Customers."

Once a global collection is created, a component member can be connected to back-end data as all or a subset of the global collection. For example, once a global collection of "all customers" is created and its connection to back-end data defined, a component of "active customers" can be connected to back-end data as a subset of the global collection. Components of "inactive customers" or "preferred customers" can also be connected as a subset of the global collection. An example screen display illustrating the process of connecting a collection component to the global collection "Customers" is shown in FIG. 14. Relational data records with multiple fields may be designated collection members. Members representing programmatic data, i.e, data structures returned from API (Application Programming Interface) calls, can also be designated collection members. In this specification, the term "relational data" comprises data structures returned from API calls.

In step 520, a user or developer selects a menu option of "create global collection" in the solution builder 248, and enters a name for the global collection. The user/developer is then prompted in step 522 to select a component from a list of existing components to correspond to the new global collection. This defines the type of data that is associated with and managed by the global collection. The user/developer is then prompted in step 524 to select a connection group from a list of existing connection groups to connect the global connection to back-end data. For example, an "Oracle" connection group connects to a back-end Oracle database, and an "MS-SQL" connection group connects to a Microsoft SQL database.

In step 526, the user/developer addresses the new global collection. Addressing a global collection provides information needed to acquire the desired collection data from the back-end environment 100. The user/developer enters program commands and configurations to associate the members of the selected component with back-end data items. In one embodiment, the user/developer addresses the new global collection by entering a query statement specifying the back-end data items to select data from, and maps the specified back-end data items to the members of the selected component. In step 528 the solution builder 248 updates the global collection list. In the preferred embodiment the updated global collection list is displayed at the bottom of the solution tree.

Connecting a component as a subset of an already defined global collection typically requires less technical skill than connecting a component directly to back-end data. Therefore, the method of creating a global collection first, then connecting components as a subset of the created global collection eases the technical burden on users and developers. Once the global collection is defined correctly, users or developers who connect components as a subset of the global collection will not connect the components to the wrong back-end data sources. The word "subset," as used in the specification and the claims, comprises "a part of" and "all of."

Figure 8:
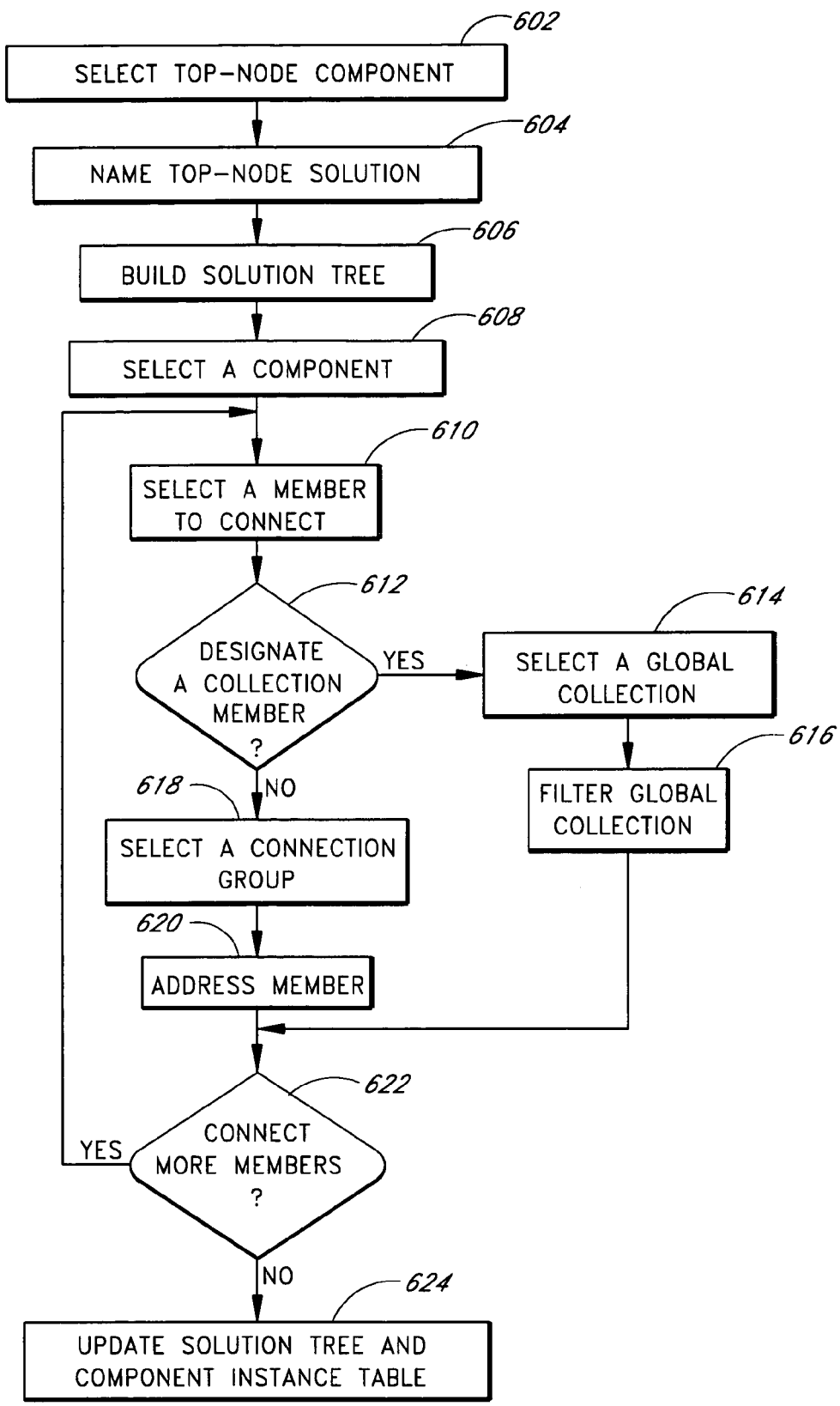
FIG. 8 is a flowchart illustrating a process of creating a solution.

FIG. 8 is a flowchart illustrating a process of creating a solution. A top-node component must first be identified to build a hierarchical object model for display, navigation and data collection. A tree-style display is one form of display of the hierarchical object model. The user or developer selects a component as the top-level component in step 602 in the solution builder 248. The developer is then prompted in step 604 to enter a top-node solution name and description. In step 606 the solution builder 248 then displays a solution tree with the selected component at the top node, its members as branches of the tree, and sub-members as sub-branches. In one embodiment only component members are shown as branches of the tree.

In one embodiment, steps 602 through 606 are preformed using a system administration module. When an object model has been created and displayed as a solution tree, a user or developer proceeds from step 608 within the solution builder 248. In step 608 a user or developer selects a component represented by a node on the solution tree, and selects the "create solution" option to connect back-end data (i.e., a back end data source) to an instance of the selected component. The user/developer is prompted in step 610 to select a member of the selected component for connecting to back-end data. In step 612 the user/developer determines whether to designate the selected member as a collection data member.

If the selected member is designated a collection data member, then the user/developer is prompted in step 614 to select a global collection from a list of existing global collections. The user/developer is then prompted in step 616 to filter the selected global collection, by selecting a subset of said global collection. For example, for a component member "active customers," the user/developer selects a global collection "all customers," and in one embodiment selects a subset of the global collection by entering program code "select from all-customers where customer-status=active." If the selected member is not designated a collection data member then the user/developer connects the member to back-end data by selecting a connection group from a list of existing connection groups in step 618, and then addressing the member in step 620. The user/developer addresses the selected member in step 620 by specifying the back-end data item that the member corresponds to.

In step 622, if the user/developer indicates he/she has completed connecting members to back-end data, then the solution builder 248 proceeds to step 624. Otherwise the solution builder 248 returns to step 610 to select another member for connection. In step 624 the solution builder 248 transmits the solution definition to the enterprise server 202 and solution server 206. The connection specification for each component member of the solution is stored in the component instance table 236, and the name and description of the solution are stored in the solution table 226.

Figure 13:
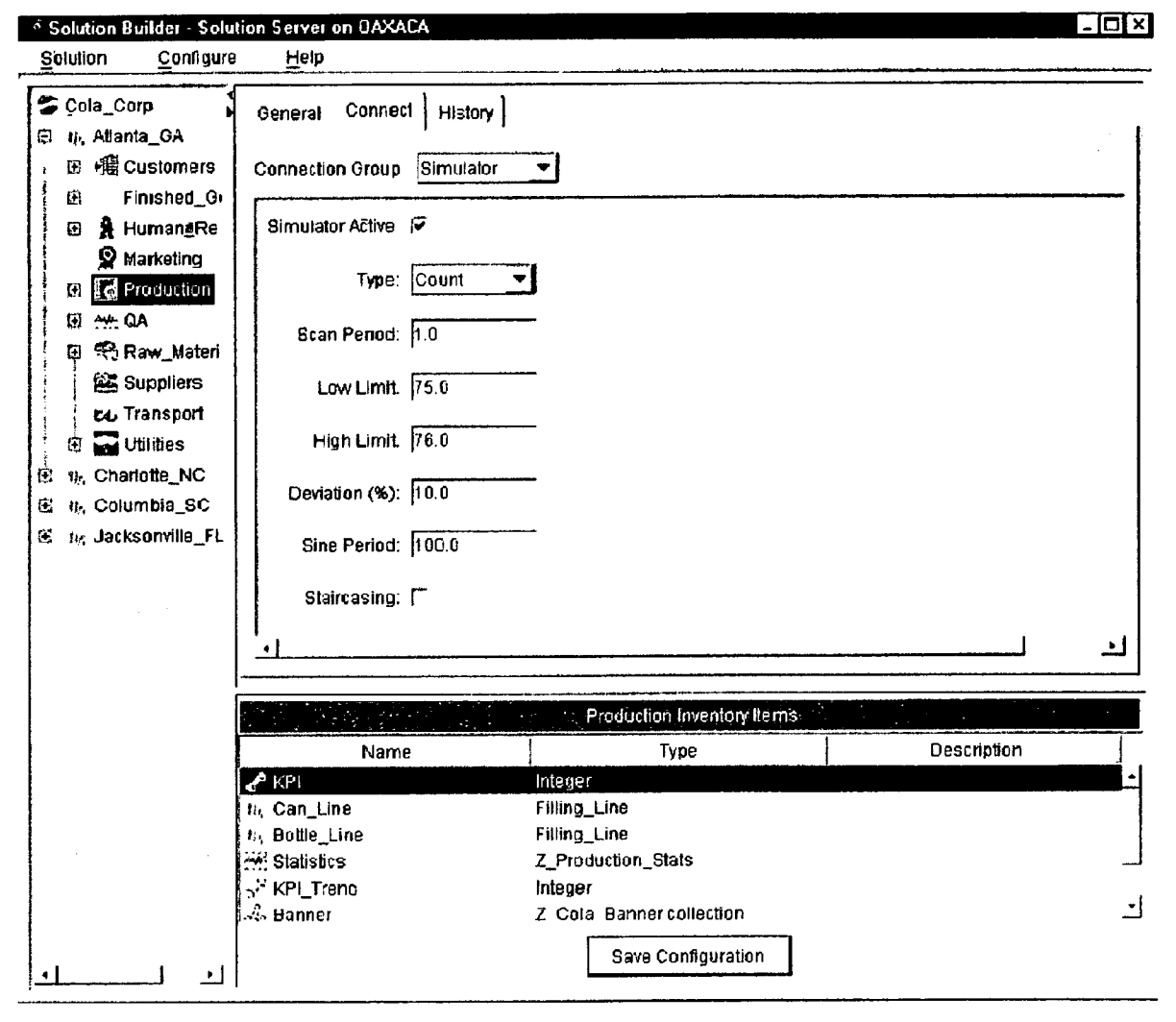

As indicated above, a developer or user may specify a solution's connection to back-end data sources through connection groups, each comprising a connection process. Each connection process comprises the program command to execute a connector. Connectors can be independent third party packages or custom programmed for the system. One embodiment uses a connector toolkit developed by the applicant that allows developers to build connectors in Java, and optionally in C or C++. A developer or user can create different connection groups that use the same connector. For example, one connection group connects to production data for last year; another connection group connects to production data for the current month, contained in the same back-end data source. One connection group may scan for data at a frequency of every second, while another connection group may scan for data, using the same connector, at a frequency of every minute. The system allows a user or developer to specify the data scanning frequency. A connection group acquires back-end data using a connection process, which comprises the program command for running a connector. An example screen display showing a connection tab screen of the solution builder 248 is shown in FIG. 13.

The solution builder 248 allows a user or developer to add, modify or delete a connection process. To add a connection process, the user/developer selects the option "add a connection process," and is prompted to enter a name and description for the new connection process. The user/developer is then prompted to enter a program command for the connection process. A developer typically performs the task of entering a program command.

The solution builder 248 also allows a user or developer to add, modify or delete a connection group. To add a connection group, the user/developer selects the option "add a connection group," and is prompted to enter a name and description for the new connection group. The user/developer is then prompted to select a connection process from a list of connection processes and a connector type from a list of connector types. A connector type is the type of a connector defined in the connector builder 250. The selected connection process is the connection process that corresponds to the new connection group. In one embodiment, the user/developer is then allowed to specify the data scanning frequency of the connection group.

Figure 9:
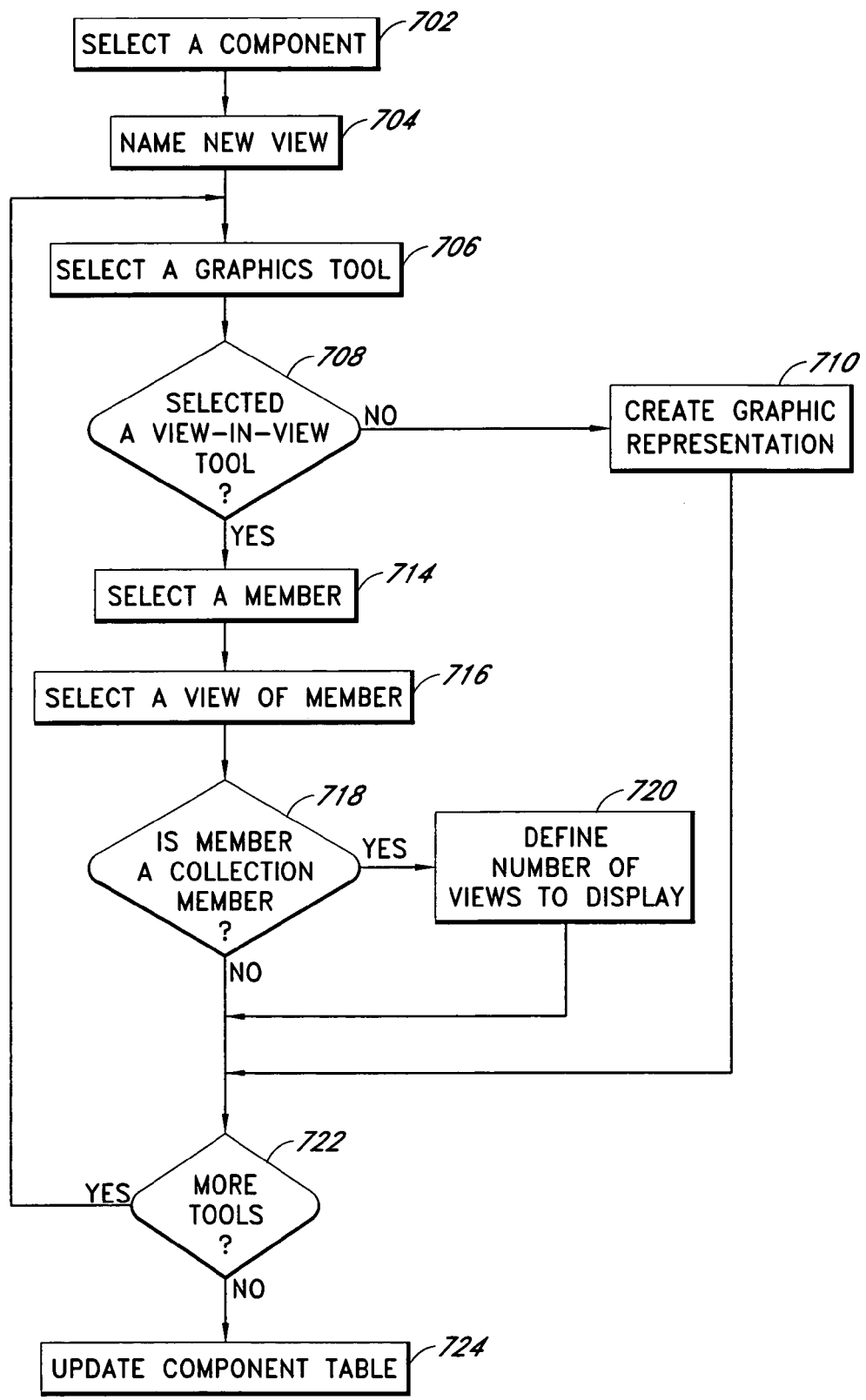
FIG. 9 is a flowchart illustrating a process of creating a view.

FIG. 9 is a flowchart illustrating a process of creating a view. In step 702, a developer or user selects a component from the catalog application 242, and selects the menu option "create new view" to create a new view corresponding to the selected component. The user/developer is then directed to the view builder 246 and prompted to enter a name for that view, in step 704. In one embodiment the user/developer is also prompted to enter a description for that view in step 704.

In step 706, the user/developer is prompted to select a graphic tool. Graphic representations are created using graphic tools, which comprise tools for drawing tables, charts, lines, animations, etc. The view builder 246 has a set of drawing tools for presenting titles, charts, tables, backgrounds graphics, and other graphical elements. The view builder 246 also allows a developer or user to create and edit animations. Animation characteristics, such as fill color and size, change based on fluctuations in back-end data. Animations contain references to component members that are linked through a solution to collect data from back-end data sources. The view builder 246 also allows the creation and editing of views as web hyperlinks to URLs (Uniform Resource Locators). In one embodiment, the user or developer starts the process of creating a view from the view builder 246.

Figure 15:
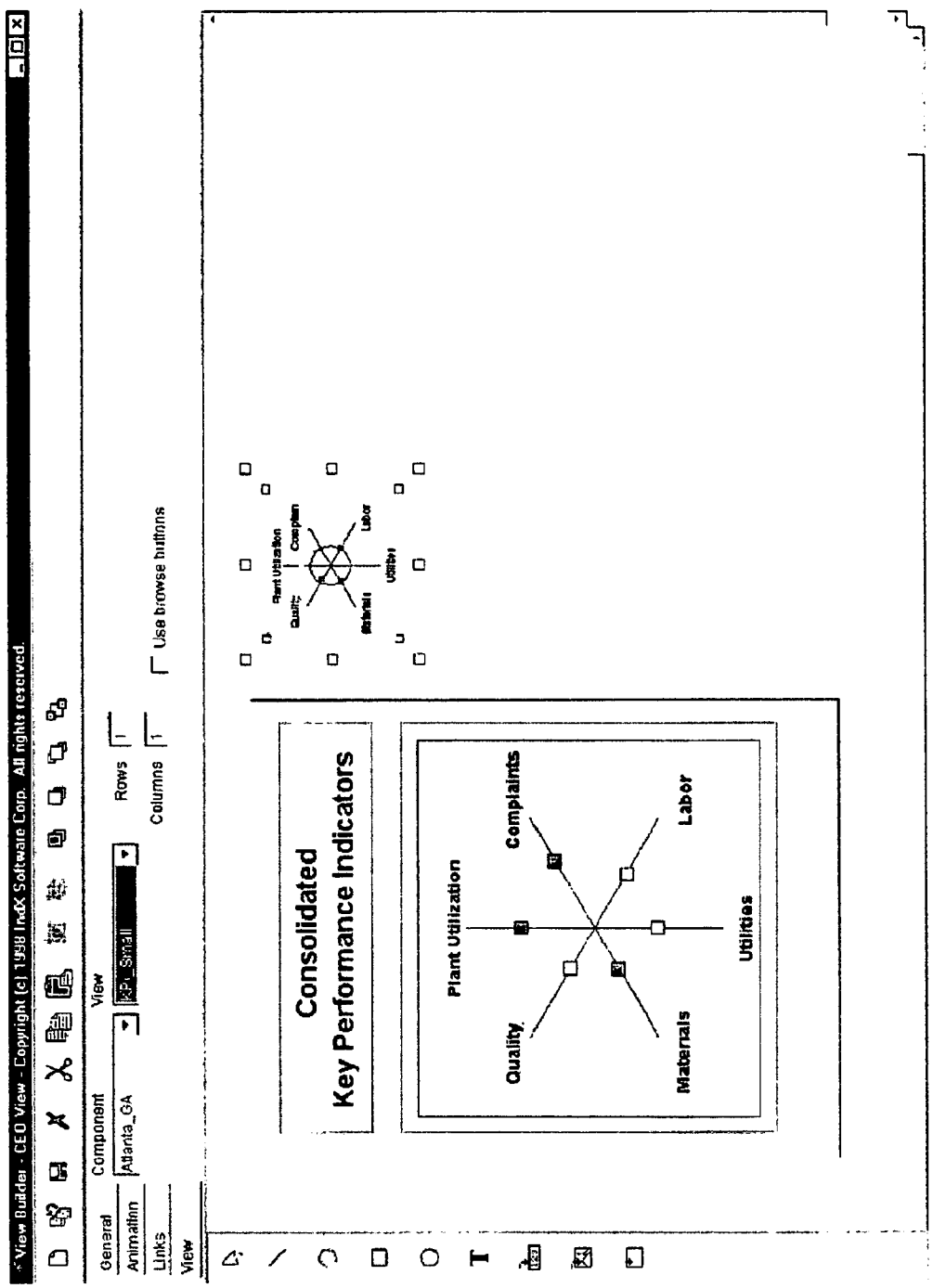
FIG. 15 is an example screen display of the view builder of FIG. 2 illustrating the process of inserting one view into another view.

If the user/developer selects a view-in-view tool, i.e. a tool for inserting a view inside a view, then step 708 proceeds to step 714. If the selected tool is not a tool for inserting a view inside a view, then step 708 proceeds to step 710. A view-in-view tool allows a user/developer to insert, within a view representing a component, a sub-view representing a component member of that component at a location determined by the user/developer. An example view builder screen display illustrating the process of inserting one view into another view is shown in FIG. 15.

In step 710 the user/developer creates graphic representation using the selected tool. The graphic representation may comprise an animation. The graphic representation also may comprise program commands for associating data values with the graphic effects. For example, a user/developer can use the selected graphic tool to represent a "pump temperature" field as a blue rectangle, and enter a program command to fill the rectangle with red color or flashing red color when temperature exceed five hundred degrees. The user/developer then is directed to step 722.

If the user/developer selects a view-in-view tool, then in step 714 the user/developer is prompted to select a member of the selected component. Since a view representing the selected member is to be inserted to the newly created view representing the selected component, the selected member is a component itself. In one embodiment the user/developer is prompted to select from a list of component members of the selected component. The user/developer is prompted to select a view from the existing views of the member component, in step 716. The user/developer uses the view-in-view tool to place the selected member view inside the newly created component view.

The view builder 246 then determines in step 718 if the selected member is designated as a collection member. If the selected member is a collection member, then the user/developer is prompted in step 720 to determine the number of views to be displayed for the collection member. In one embodiment the user/developer is prompted to enter the number of rows and columns to be displayed for the collection member.

In step 722, the user/developer can opt to return to step 706 to continue preparation of the graphic representation of the selected component. If the user/developer indicates that the view is complete, the view builder 246 transmits the created view definition to enterprise server 202 to be stored in the component table 222 (step 724).

In one embodiment, a default view is defined for each component that has one or more views associated with the component. When a component has no corresponding views, the first view created for that component is defined as the default view. When a component has one or more corresponding views, a user/developer can define the default view by selecting the component in the catalog application 242 and entering a "update component—update default view" option. This embodiment can be achieved by having a "default view? Yes or No" logical field within the view definition, or by having a "default view" field within the component definition containing the name of the default view. When a view representing a component having a component member is displayed, the sub-view representing the component member is also displayed. When a user/developer selects the sub-view, preferably by highlighting or double-clicking with a mouse, the default view representing the component member is displayed. For example, within a view representing a plant operation is displayed a view representing a motor. When the view representing the motor is selected, the default view representing the motor is displayed, which is typically a detailed view of the motor. A user/developer is thus allowed to "drill down" to further details. A user/developer can also select another view of the component member, preferably by right-clicking on the sub-view to bring up a list of views corresponding to the component member and selecting one of the views from the list.

At run time, data is retrieved through connections defined in a solution, and displayed using a view associated with the component that is associated with the solution.

The provisional application on which this application is based, including its attached "Indx XHQ User's Guide," is hereby incorporated into the specification.

Although the foregoing has been a description and illustration of specific embodiments of the invention, various modifications and changes can be made thereto by persons skilled in the art without departing from the scope and spirit of the invention as defined by the following claims.

What is claimed is:

1. A development system for developing computer models for the collection and display of data, the development system comprising:
    a component builder that provides functionality for generating reusable components for collecting data from back-end data sources, including back-end data sources associated with business elements, whereby a user may create a reusable component that represents a particular type of business element;
    a view builder that provides functionality for generating reusable views that correspond to specific components generated by the component builder, whereby a user can generate one or more views that specify how data collected by a corresponding component is to be displayed, wherein the view builder provides functionality for inserting a view corresponding to a first component within a view corresponding to a second component;
    a catalog that contains components generated with the component builder; and
    a module that provides functionality for selecting components from the catalog, creating multiple instances of a selected component to represent multiple elements of a common type, and connecting an instance to a respective source of back-end data to allow that instance to collect data.

2. The development system of claim 1, wherein the component builder provides functionality for generating a component that includes one or more other components generated by the component builder, whereby sub-units of an element are modeled as sub-components of the component representing that element.

3. The development system of claim 1, wherein the module enables a user to specify a frequency with which data is to be collected from a selected data source.

4. The development system of claim 1, wherein the module enables a user to separately specify, for each instance of a component, a frequency with which data is to be collected from a corresponding data source.

5. The development system of claim 1, wherein the component builder provides functionality for generating components that collect point data, relational data, and time series data.

6. The development system of claim 1, wherein the component builder provides functionality for generating components that collect data structures via application program interface (API) calls.

7. A method of generating a computer model for the collection and display of data, the method comprising:
    generating a first reusable software component that collects data from a first type of data source;
    generating a first reusable view that specifies how data collected by the first component is to be displayed;
    generating a second reusable software component that collects data from a second type of data source, said second component including the first component as a member; and
    generating a second reusable view that specifies how data collected by the second component is to be displayed, said second view including the first view such that when a user accesses the second view to view data collected by the second component, the first view is displayed within the second view.

8. The method of claim 7, wherein the second component represents a plant, and the first component represents an item of machinery within the plant.

9. The method of claim 7, wherein the second component represents a manufacturing facility, and the first component is configured to collect data describing a status of an element of machinery within the manufacturing facility.

10. The method of claim 7, wherein the second component represents a business unit, and the first component represents a department of the business unit.

11. The method of claim 7, further comprising representing the first and second components within a hierarchical navigation structure such that the first component is represented as a child of the second component, said hierarchical navigation structure being browsable by users to view data collected by at least the first and second components.

12. The method of claim 11, further comprising responding to user selection of the second component within the hierarchical navigation structure by displaying the second view.

13. The method of claim 7, further comprising creating multiple instances of the second component to represent multiple respective data sources of the second type, each instance of the second component including a respective instance of the first component.

14. The method of claim 7, wherein the first component collects time series data, and the first view displays said time series data.

15. The method of claim 7, wherein the first component collects both point data and relational data, and the first view displays said point data and relational data.

16. A computer model generated according to the method of claim 7 represented within computer storage.

17. A model development system capable of performing the method of claim 7 to generate a model.

18. A method of generating a computer model for the collection and display of data, the method comprising:
 generating a first reusable software component that collects data from a first type of data source;
 generating a first reusable view that specifies how data collected by the first component is to be displayed;
 creating multiple instances of the first component, each such instance corresponding to a different respective data source of the first type and using the first view to display data collected therefrom; and
 connecting each instance of the first component to its respective data source such that at least some of the multiple instances are configured to retrieve data from their respective data sources at different frequencies than others.

19. The method of claim 18, wherein the method comprises separately specifying a data retrieval frequency for each instance of the first component.

20. The method of claim 18, wherein connecting each instance of the first component to its respective data source comprises specifying program code for establishing a connection between a data source and an instance of the first component.

21. The method of claim 18, further comprising generating a second reusable software component that collects data from a second type of data source, said second component including the first component as a member.

22. The method of claim 21, further comprising generating a second reusable view that specifies how data collected by the second component is to be displayed, said second view including the first view such that when a user accesses the second view to view data collected by an instance of the second component, the second view is displayed within the first view.

23. The method of claim 21, wherein the second component represents a plant, and the first component represents an item of machinery within the plant.

24. The method of claim 21, further comprising displaying a navigation interface in which the first component is represented as a child of the second component within a hierarchical node structure, wherein nodes of the hierarchical node structure are selectable to view data collected by corresponding components.

25. A computer model generated according to the method of claim 18 represented within computer storage.

26. A model development system capable of performing the method of claim 18 to generate a model.

27. A computer model for the collection and display of data from multiple sources, comprising, within computer storage:
 a plurality of instances of a first reusable component, each instance of the first component including a respective instance of a second reusable component, wherein the first component collects data associated with a first business element and the second component collects data associated with a second business element that is a sub-unit of the first business element;
 a first reusable view that specifies how data collected by instances of the first component is to be displayed, and a second reusable view that specifies how data collected by instances of the second component is to be displayed; and
 a navigation interface that represents each instance of the first component and each instance of the second component as a respective node within a hierarchical node structure such that each instance of the second component is represented as a child of a respective instance of the first component, wherein each node that represents an instance of the first component is user-selectable by a user to view collected data using said first view, and each node that represents an instance of the second component is user-selectable to view collected data using said second view.

28. The computer model of claim 27, wherein the second view is included as a component of the first view such that, when the first view displays data collected by an instance of the first component, the second view displays data collected by a corresponding instance of the second component within a display area of the first view.

29. The computer model of claim 27, wherein the first business element is a plant, and the second business element is an item of machinery within the plant.

30. The computer model of claim 27, wherein the first component represents a manufacturing facility, and the second component is configured to collect data describing a status of an element of machinery of the manufacturing facility.

31. The computer model of claim 27, wherein the first component represents a business unit, and the second component represents a department of the business unit.

32. The computer model of claim 27, wherein the second component is one of a plurality of reusable components that are included within the first component, each of said plurality of reusable components representing a respective business element that is a sub-unit of the first business element.

33. The computer model of claim 27, wherein at least some instances of the second component are configured to retrieve data using different data retrieval frequencies than other instances of the second component.

34. The computer model of claim 27, wherein the navigation interface is web based such that users can navigate the hierarchical node structure using a web browser.

35. The computer model of claim 27, wherein the data collected by the instances of the first reusable component includes time series data.

36. The computer model of claim 27, wherein the data collected by the instances of the first reusable component includes point data and relational data.

37. The computer model of claim 27, wherein the data collected by the instances of the first reusable component includes data structures returned from application program interface (API) calls.

* * * * *